(12) United States Patent
Mohr

(10) Patent No.: US 6,449,487 B1
(45) Date of Patent: Sep. 10, 2002

(54) COMPUTERIZED TELEPHONE APPARATUS

(75) Inventor: Asaf Mohr, Hod Hasharon (IL)

(73) Assignee: Vdonet Corporation Ltd., Hod Hasharon (IL)

( * ) Notice: Subject to any disclaimer, the term of this patent is extended or adjusted under 35 U.S.C. 154(b) by 0 days.

(21) Appl. No.: 09/046,476

(22) Filed: Mar. 23, 1998

Related U.S. Application Data

(62) Division of application No. 08/557,292, filed on Nov. 14, 1995, now Pat. No. 5,878,118.

(30) Foreign Application Priority Data

Nov. 14, 1994 (IL) .................................................. 111634

(51) Int. Cl.$^7$ ................................................. H04Q 7/20

(52) U.S. Cl. ...................... 455/462; 455/557; 455/550; 379/93.09

(58) Field of Search .................................. 455/552, 550, 455/575, 553, 557, 561, 560, 461, 462, 554, 555, 465, 463, 414; 379/77, 201, 210, 202–204, 206, 93.09

(56) References Cited

U.S. PATENT DOCUMENTS

| | | |
|---|---|---|
| 4,086,438 A | 4/1978 | Kahn et al. |
| 4,578,540 A | 3/1986 | Borg et al. |
| 4,670,628 A | 6/1987 | Boratgis et al. |
| 4,807,279 A | 2/1989 | McClure et al. |
| 4,893,335 A | 1/1990 | Fulle et al. |
| 4,903,289 A | 2/1990 | Hashimoto |
| 5,230,023 A | 7/1993 | Nakano |
| 5,463,674 A | * 10/1995 | Gillig et al. ................. 455/552 |
| 5,483,579 A | 1/1996 | Stogel |
| 5,535,265 A | 7/1996 | Suwandhaputra |
| 5,903,835 A | * 5/1999 | Dent .......................... 455/552 |

* cited by examiner

*Primary Examiner*—Doris H. To
(74) *Attorney, Agent, or Firm*—Eitan, Pearl, Latzer & Cohen-Zedek

(57) ABSTRACT

The present invention discloses a single-line computerized conferencing apparatus including an apparatus for receiving from a caller within a telephone network an indication of a desired subscriber within the telephone network and a computerized conferencing device connected to the telephone network via a single telephone line and operative to provide a conference call between the computerized apparatus, the caller and the subscriber.

3 Claims, 8 Drawing Sheets

COMPUTERIZED TELEPHONE APPARATUS

This is a divisional of application Ser. No. 08/557,292 filed on Nov. 14, 1995 now U.S. Pat. No. 5,878,118 claims the benefit thereof and incorporates the same by reference.

FIELD OF THE INVENTION

The present invention relates to computerized telecommunications.

BACKGROUND OF THE INVENTION

There are existing telephone services, typically 1-800 numbers, which provide a dialing tone in response to an incoming call from any one of a typically large population of subscribers. The caller then dials a telephone number of a desired subscriber and is connected to that subscriber. These services are available either through PABX's or as a Centrex service. The caller must provide the telephone number of the desired subscriber and cannot request that the telephone number be provided in response to provision of other information such as the subscriber name.

Telephone network operators, such as cellular telephone network operators and long-distance operators provide a voice-assisted dialing system which is trained by each of a plurality of callers to contact a limited number of subscribers upon receipt of oral identification of a desired subscriber.

In corporate voice-mail systems, it is possible to enter a dialogue menu in which the caller is prompted to provide a touch-tone identification of a desired extension within the local PABX.

There are audio/telephony add-on cards, such as the IBM M-Wave, which allow a telephone to be employed as an instrument for providing audio input to a computer and for receiving audio output therefrom.

SUMMARY OF THE INVENTION

The present invention seeks to provide improved apparatus and methods for computerized telecommunications.

There is thus provided in accordance with a preferred embodiment of the present invention single-line computerized conferencing apparatus including apparatus for receiving from a caller an indication of a desired subscriber within the telephone network, and a computerized conferencing device connected to the telephone network via a single telephone line and operative to provide a conference call between the computerized apparatus, the caller and the subscriber.

Further in accordance with a preferred embodiment of the present invention the indication of the desired subscriber is at least partly transmitted by voice.

Still further in accordance with a preferred embodiment of the present invention the indication of the desired subscriber is at least partly transmitted by touch-tone dialing.

There is also provided in accordance with another preferred embodiment of the present invention a computerized communications system including a toll-free radio cordless handset via which a user may generate a command, and a computer in toll-free radio communication with the cordless handset and operative to receive and carry out the command.

Further in accordance with a preferred embodiment of the present invention the handset has a single off-hook button which, when activated, establishes an audio link between the handset and the computer if the computer is on.

Still further in accordance with a preferred embodiment of the present invention the off-hook button, when activated, establishes a link between the handset and the telephone network, if the computer is off.

Additionally in accordance with a preferred embodiment of the present invention the computer is operative, upon receipt of a predetermined signal from the handset, to connect the handset to the telephone network.

Moreover in accordance with a preferred embodiment of the present invention the command is transmitted at least partly as voice input.

Further in accordance with a preferred embodiment of the present invention the command is transmitted at least partly as touch tone input.

There is also provided in accordance with another preferred embodiment of the present invention a method for modifying a cordless handset base normally connected to a telephone network to allow the base to link the cordless handset to a computer, the method including providing selective connection circuitry selectively linking the base to the computer or to the telephone network, and controlling the operation of the connection circuitry so as to connect the base either to the computer or to the telephone network in accordance with a predetermined criterion arriving from the cordless handset.

Further in accordance with a preferred embodiment of the present invention the predetermined criterion includes whether the computer is on or off and wherein the controlling process includes sensing whether the computer is on or off.

There is also provided in accordance with another preferred embodiment of the present invention apparatus for selectively connecting a cordless handset base to a telephone network or to a computer, the apparatus including selective connection circuitry selectively linking the base to the computer or to the telephone network, and a connection circuitry controlling device operative to control the operation of the connection circuitry so as to connect the base either to the computer or to the telephone network in accordance with a predetermined criterion arriving from the cordless handset.

Further in accordance with a preferred embodiment of the present invention the indication of a desired subscriber includes subscriber identifying information other than the subscriber's telephone number and also including a computerized directory, and a directory accessing device operative to access the computerized directory and to retrieve the telephone number of the desired subscriber, based on the subscriber identifying information.

There is also provided in accordance with another preferred embodiment of the present invention a computerized communications system including a telephone instrument via which a user may generate a command, and a computer in local communication with the telephone and operative to receive and carry out the command.

There is also provided in accordance with another preferred embodiment of the present invention a method for modifying a telephone instrument normally connected to a telephone network to allow the telephone instrument to be linked to the computer, the method including providing selective connection circuitry selectively linking the telephone instrument to the computer or to the telephone network, and controlling the operation of the connection circuitry so as to connect the telephone instrument either to the computer or to the telephone network in accordance with a predetermined criterion provided by a user via the speaker of the telephone instrument.

There is also provided in accordance with another preferred embodiment of the present invention a computerized communications system including a computer, a telephone instrument selectively connected to the computer and to a telephone network, and a speech activity detector operative to connect the telephone instrument to the computer or to the telephone network in accordance with detected speech activity.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
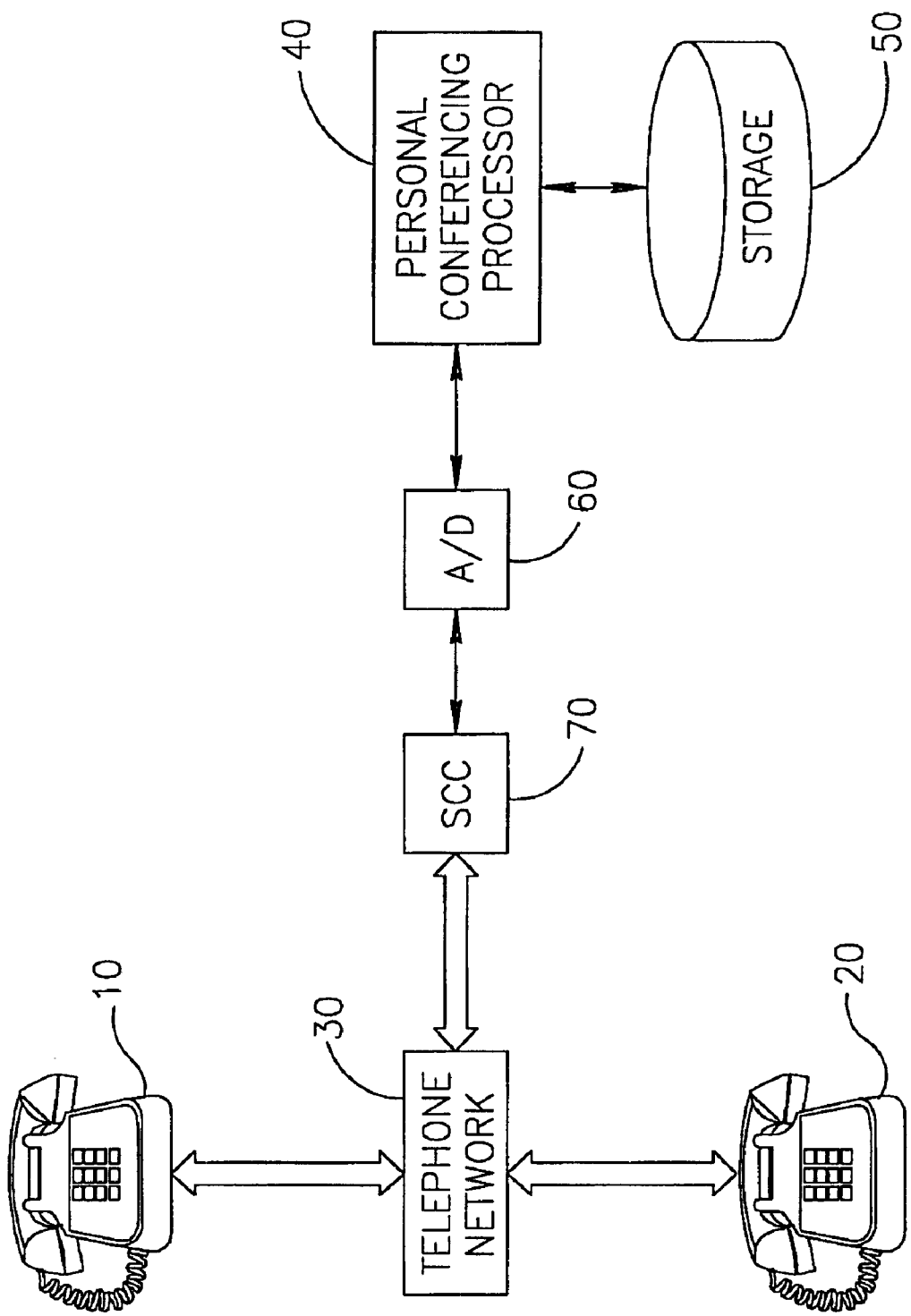
FIG. 1 is a functional block diagram of single-line computerized conferencing apparatus, constructed and operative in accordance with a preferred embodiment of the present invention, which is servicing a caller who is accessing the apparatus via a public telephone network.

Reference is now made to FIG. 1 which is a functional block diagram of single-line computerized conferencing apparatus operative to automatically provide telephone communication between a caller having a handset 10 and a desired subscriber whose handset is referenced 20, through a telephone network 30. The telephone network 30 may be either a public network or a private network (PABX). The apparatus comprises a personal conferencing processor 40 operatively associated with a digital storage device 50 such as a hard disc, an A/D converter 60, and selective connection circuitry 70.

Figure 2:
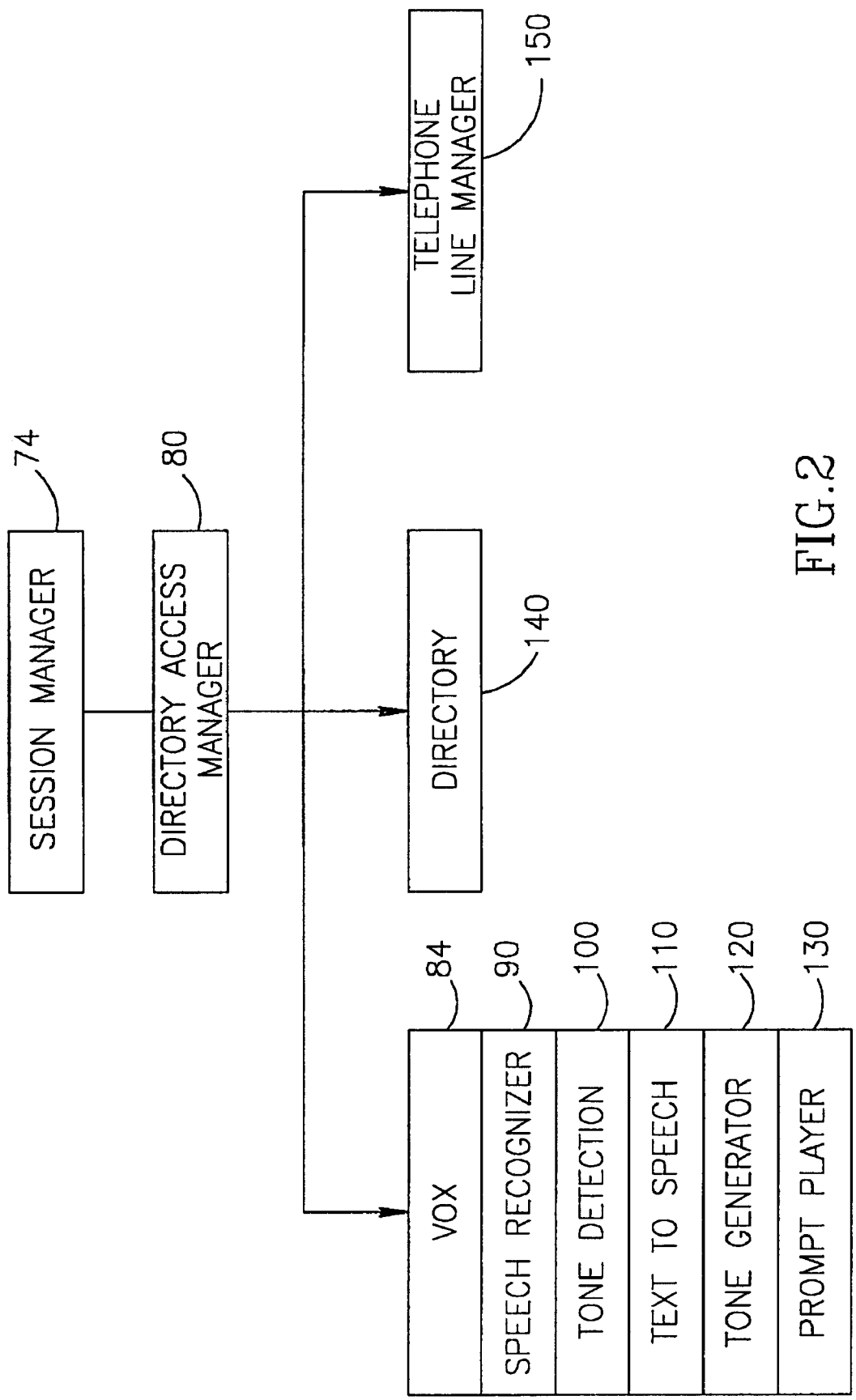
FIG. 2 is a logic diagram of the personal conferencing processor 40 of FIG. 1.

The personal conferencing processor 40 of FIG. 1, as illustrated in FIG. 2, includes a session manager 74 and a directory access manager 80 both of which receive services from a stack of speech and telephony functions such as a speech activity detector or VOX (voice operated switch) 84, a speech recognition function 90, a touch-tone detection function 100, a text-to-speech function 110, a tone generator 120 and a prompt player 130. The directory access manager 80 also is operatively associated with a personal telephone directory 140 and with a telephone line manager 150. Session manager 74 is also typically operatively associated with the line manager 150.

Figure 3:
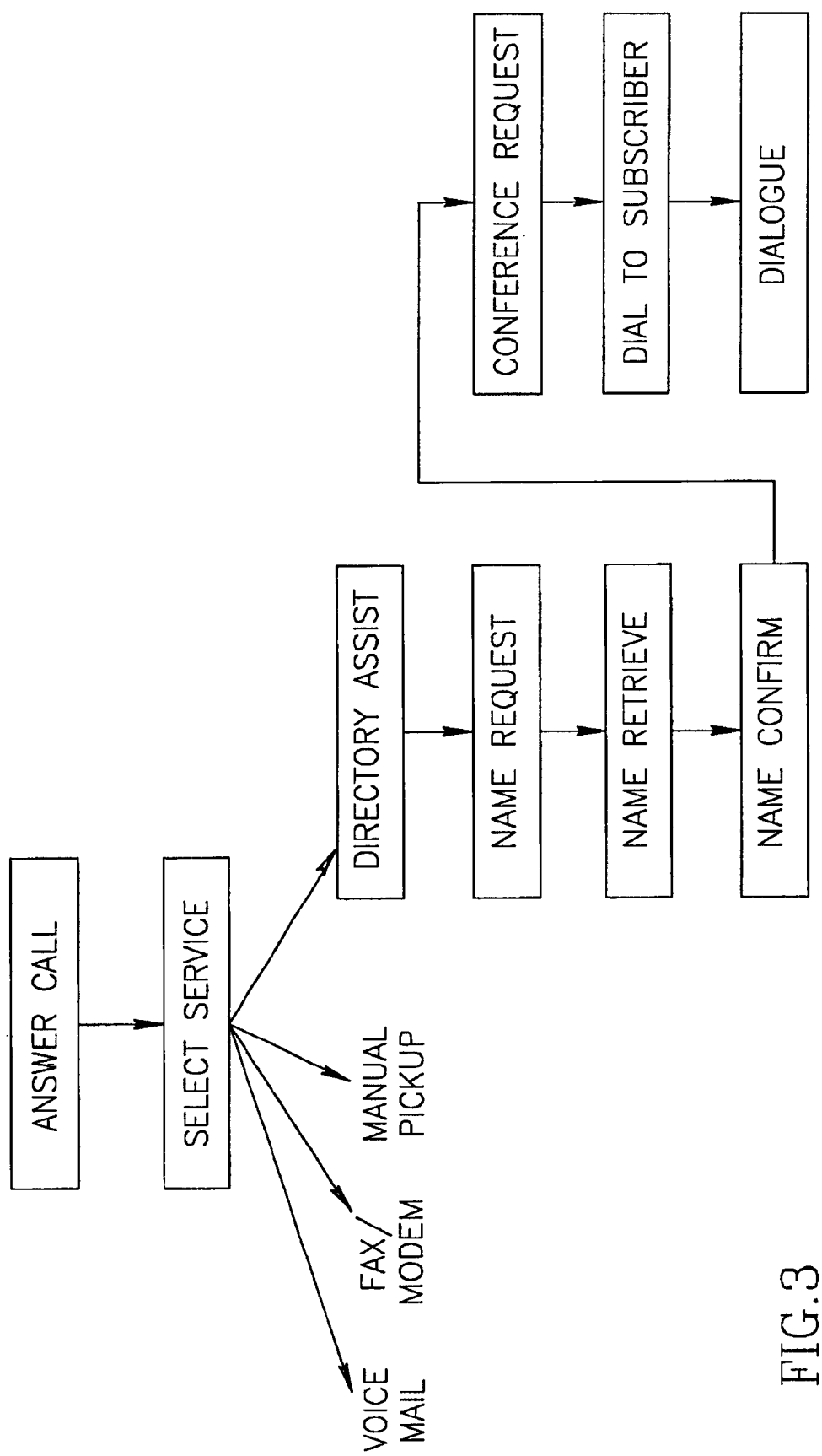
FIG. 3 is a flowchart of one preferred method of operation for the directory access session manager 78 of FIG. 2.

FIG. 3 is a flowchart of a preferred method of operation for the session manager 74 in conjunction with the directory access manager 80. The line manager 150 detects a ring and is instructed by the session manager 74 to determine whether the incoming call is a fax/modem call or a voice call. If it is a voice call, the line manager is instructed by the session manager 74 to check whether the caller wishes to carry on a conversation, leave a voice mail message or obtain directory or dialing assistance. If directory or dialing assistance is required, the session manager 74 invokes the directory access manager 80.

For example, the line manager may be operative to detect a fax signal and, if no fax signal is detected, the session manager may instruct the line manager to provide an oral prompt instructing the caller to indicate via particular touch-tones whether voice mail, conversation or directory/dialing assistance is required.

Upon receipt of an incoming call indication by session manager 74, the directory access manager 80 prompts the caller, via prompt player 130 and line manager 150, to identify the desired subscriber, either orally or via touch tone input. The call input is interpreted by speech recognition unit 90 or by touch-tone detection unit 100. Using the information provided by the caller, the directory 140 is accessed and the telephone number of the desired subscriber is retrieved. Preferably, the telephone number and other particulars of the desired subscriber are orally or otherwise presented to the caller for his confirmation.

The directory access manager 80 instructs the telephone line manager 150 to provide a predetermined tone or sequence of tones which is interpreted by the public network as a request to initiate a conference call.

The directory access manager 74 then instructs the telephone line manager 150 to dial the telephone number of the desired subscriber and to connect the caller to the subscriber, so as to effect the conference call.

If the caller disconnects, the directory access manager 80 in conjunction with the session manager 74 instructs the telephone line manager 150 to disconnect the subscriber and the entire system returns to its idle state.

Figure 4:
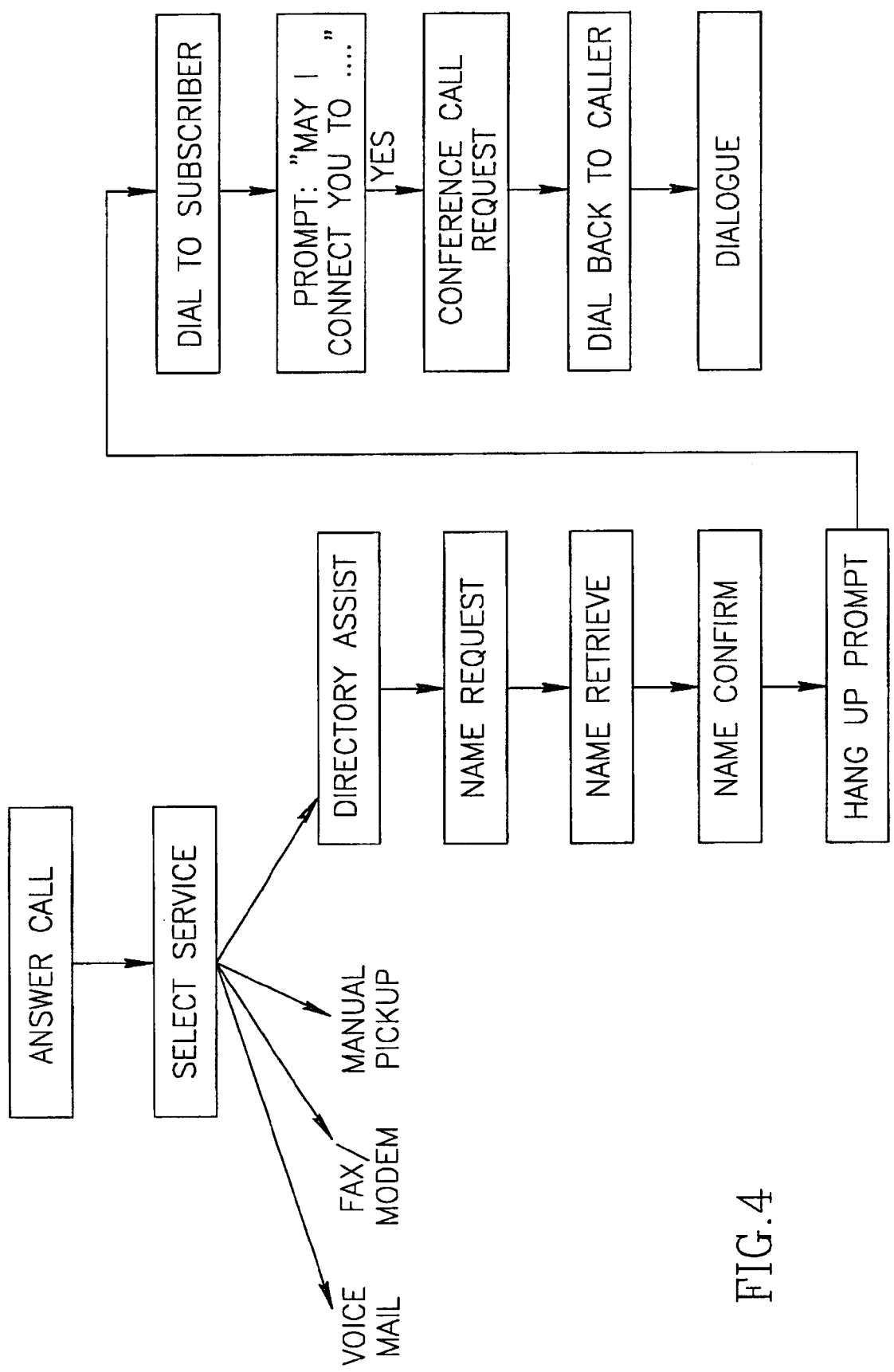
FIG. 4 is a flowchart of another preferred method of operation for the directory access session manager 80 of FIG. 2.

Reference is now made to FIG. 4 which is a flowchart of a method of operation for session manager 74 in conjunction with directory access manager 80 which is a modification of the method of FIG. 3.

In FIG. 4, the initial stages of receiving a call and providing directory assistance are similar to the corresponding stages in FIG. 3. However, once the desired subscriber's telephone number has been retrieved and confirmed, the directory access manager 80 instructs the prompt player 130 to prompt the caller to hang up. The session manager 74 then instructs the telephone line manager 150 to dial the desired subscriber and, optionally to provide, via prompt player 130 an explanatory message indicating that the caller who has now hung up wishes to hold a conversation including an optional prompt to provide confirmation that the call should be put through. The confirmation may be provided either orally or via touch-tone input.

The session manager 74 then instructs the line manager 150 to provide a predetermined tone or sequence of tones which is interpreted by the public network as a request to initiate a conference call. The line manager is then instructed to call back the original caller in order to effect the conference call.

Figure 5A:
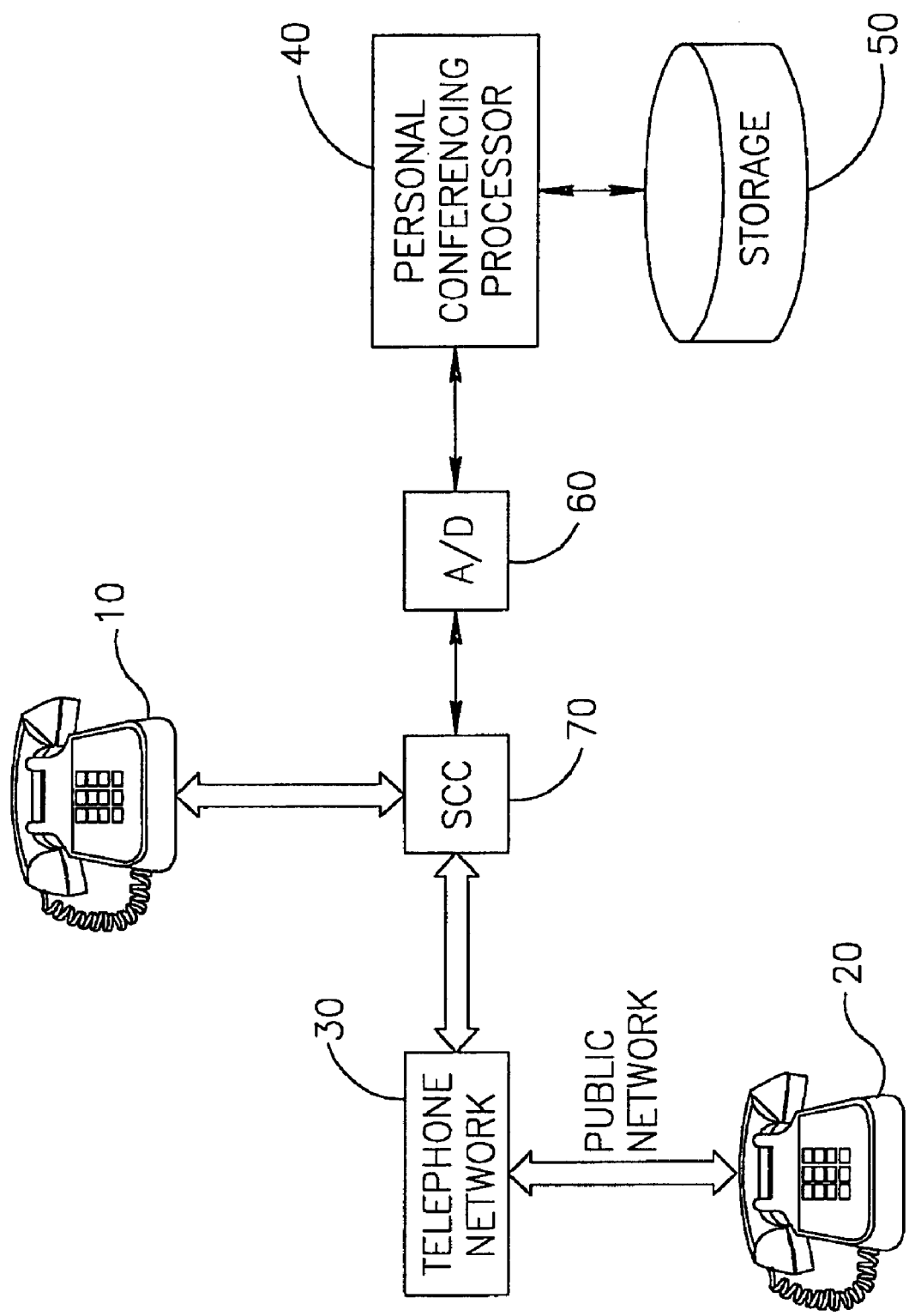
FIG. 5A is a functional block diagram of single-line computerized conferencing apparatus, constructed and operative in accordance with a preferred embodiment of the present invention, which is servicing a caller who is accessing the apparatus via a telephone instrument locally attached to the conferencing apparatus.

FIG. 5A is a functional block diagram of single-line computerized conferencing apparatus, constructed and operative in accordance with a preferred embodiment of the present invention, which is servicing a caller who is accessing the apparatus via a telephone instrument locally attached to the conferencing apparatus.

Figure 5B:
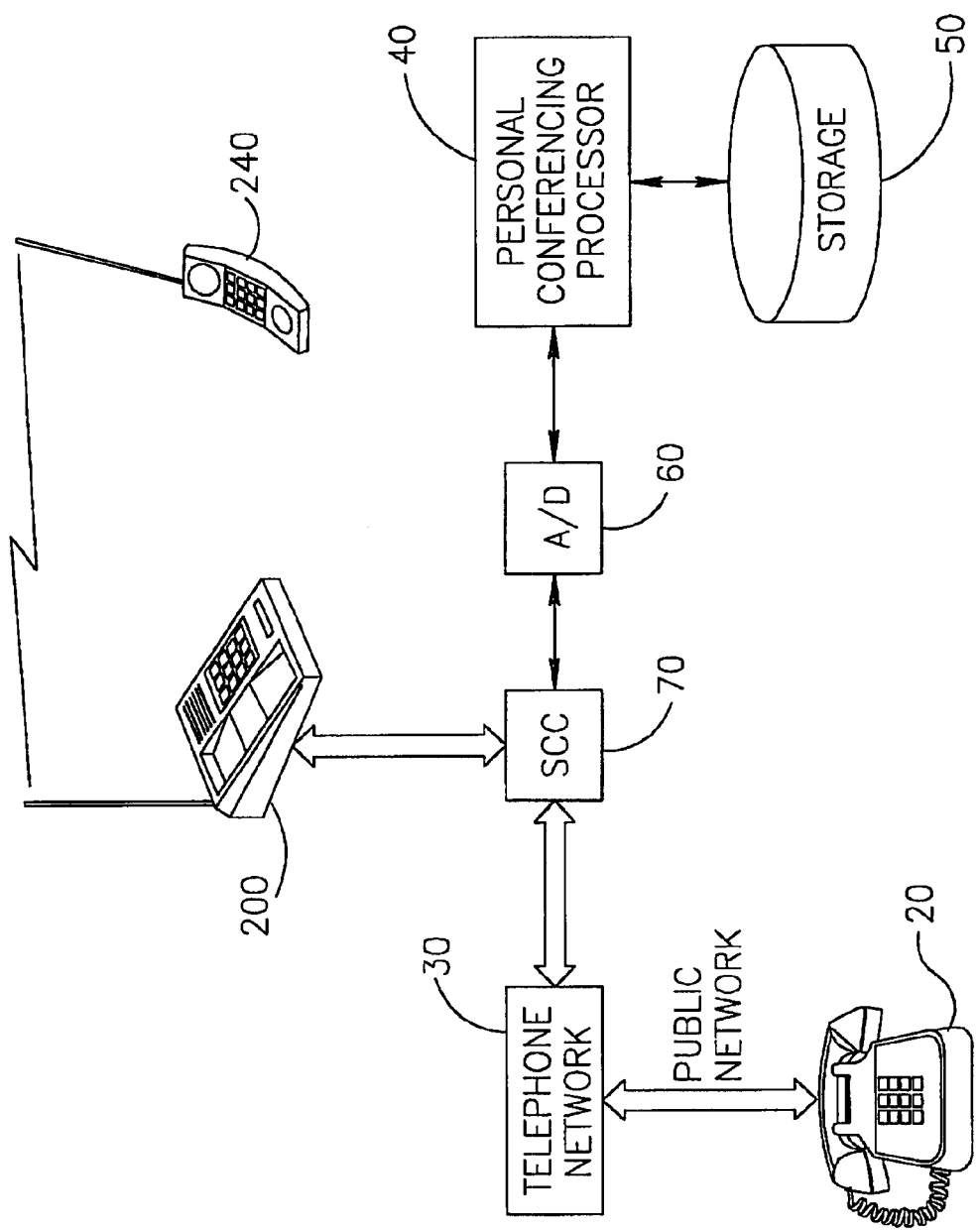
FIG. 5B is a functional block diagram of single-line computerized conferencing apparatus, constructed and operative in accordance with a preferred embodiment of the present invention, which is servicing a caller who is accessing the apparatus via a telephone base which is locally attached to the conferencing apparatus and is operatively associated with a cordless handset.

FIG. 5B is a functional block diagram of single-line computerized conferencing apparatus, constructed and operative in accordance with a preferred embodiment of the present invention, which is servicing a caller who is accessing the apparatus via a telephone base which is locally attached to the conferencing apparatus and is operatively associated with a cordless handset.

The apparatus of FIG. 5B includes selective connection circuitry 70 selectively linking the base 200 to the personal conferencing processor 40 or to the telephone network 30.

Figure 6:
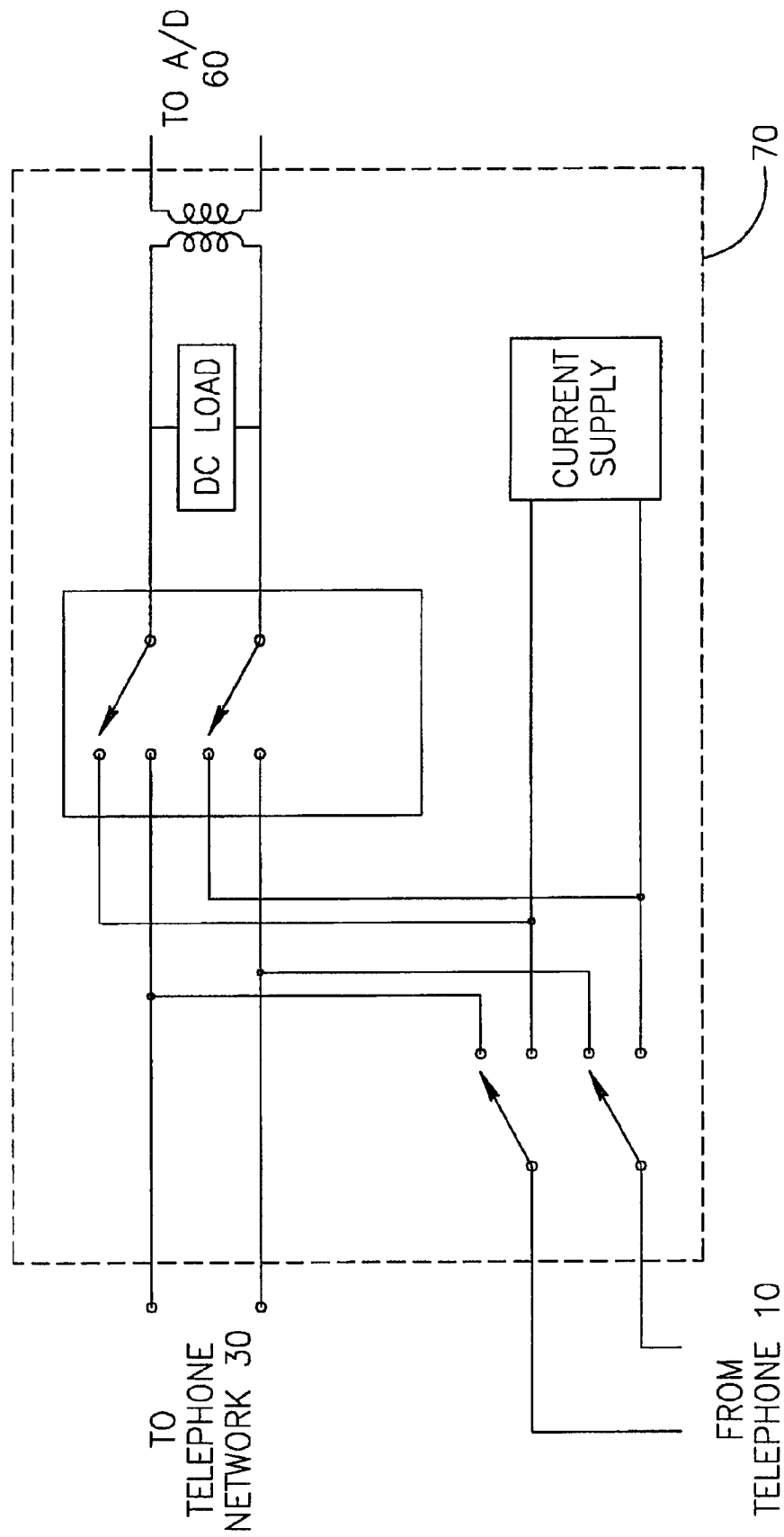
FIG. 6 is a schematic diagram of the selective connection circuit of FIGS. 5A and 5B.

FIG. 6 is a schematic diagram of the selective connection circuitry 70 of FIGS. 5A and 5B. The connection circuitry controlling element is operative to control the operation of the connection circuitry so as to connect the base either to the computer or to the telephone network in accordance with a predetermined criterion arriving from the telephone handset 10 of FIG. 5A or from the cordless handset 240 of FIG. 5B.

The predetermined criterion may, for example, comprise the presence of speech which indicates that the handset is to be connected to the computer, whereas the absence of speech indicates that the handset is to be connected to the telephone network. Alternatively, however, a predetermined sequence of one or more touch tones, such as # or * or some combination thereof, may indicate that the handset is to be connected to the computer whereas the absence of these tones indicate that the handset is to be connected to the telephone network 30.

The personal conferencing processor 40 may include some or all of the elements of FIG. 2. If the predetermined criterion arriving from the telephone instrument or cordless handset thereof is the presence of speech, then the connection circuitry controlling element may be implemented by telephone line manager 150 which receives an indication of the presence of speech from the VOX 84.

The cordless handset of the telephone uses toll-free radio frequencies for voice communication with radio base station 200 of FIG. 5B. The handset typically comprises any conventional cordless telephone complying with FCC part 15. Upon activation of the master button of the handset, typically labeled "talk", an active radio channel is selected between the base station and the handset. This radio channel may transmit audio signals in either FM (frequency modulation) or digital transmission.

Instead of now routing the signals directly to the telephone network, the signals are routed into the selective connection circuitry 70 from which they are routed either to the telephone network 30 or to the personal conferencing processor 40 depending on a predetermined criterion.

Typically, control of the selective connection circuitry is such that:
  a. If the computerized conferencing apparatus is off, the signals arriving from the handset are routed to the telephone network 30.
  b. Otherwise, the signals are routed to the personal conferencing processor 40. The personal conferencing processor has a selective connection circuitry control function which determines whether to retain the signals or whether to route the signals over to the telephone network 30. As described above, the selective connection circuitry control function is preferably operatively associated with the VOX 84 of FIG. 2.

Figure 7:
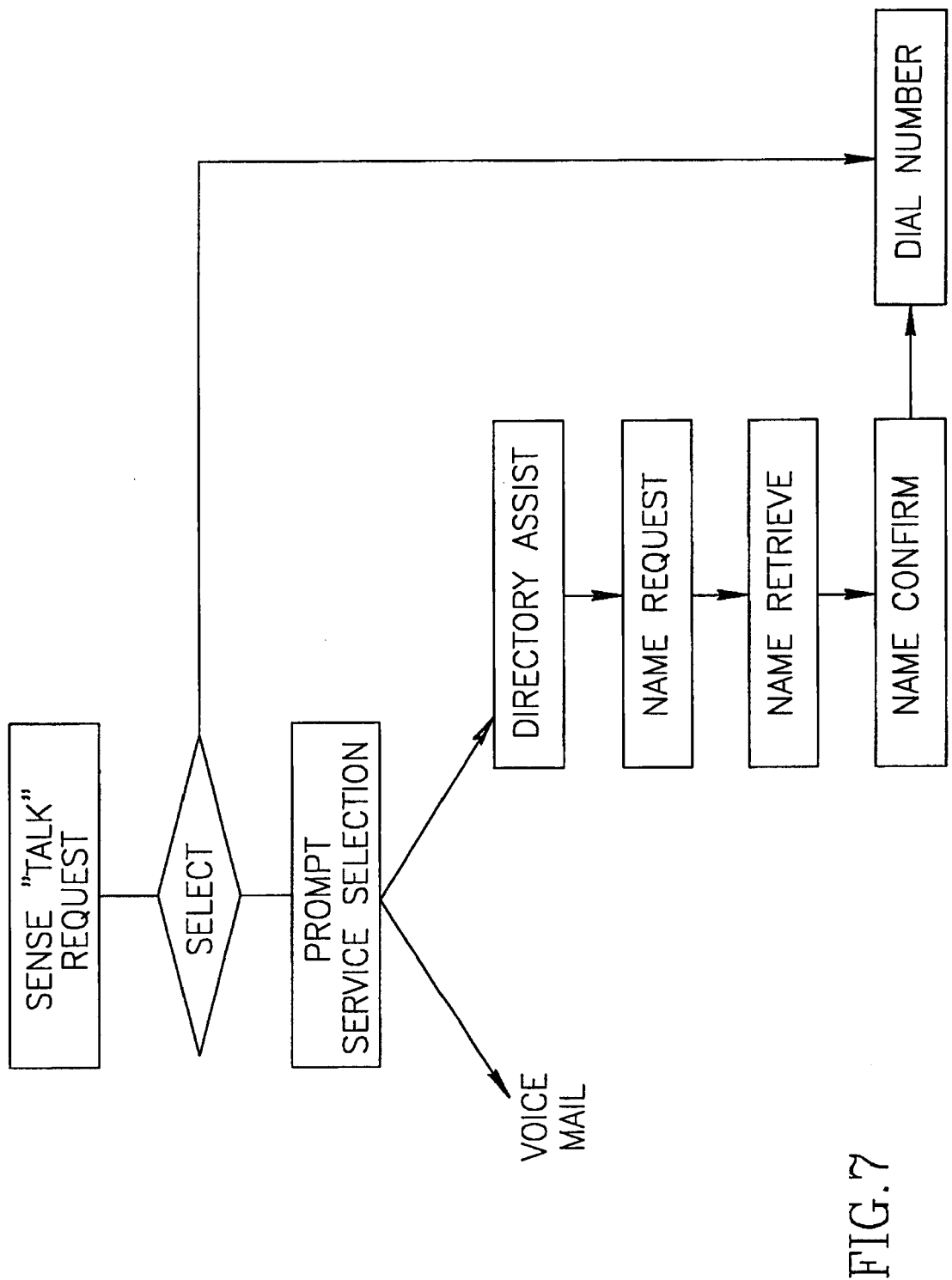
FIG. 7 is a flowchart of a preferred method of operation for computer 220 of FIGS. 5A and 5B.

Reference is now made to FIG. 7 which is a flowchart of a preferred method of operation for personal conferencing processor 40 of FIGS. 5A and 5B. It is appreciated, however, that alternatively, the selective connection circuitry 70 of FIG. 6 and the associated control element may reside in the base of the telephone and/or in an adaptor box residing between the base and the computer.

The method of FIG. 7 preferably includes the following stages:

The caller presses the "talk" button of the handset. The session manager 74 of FIG. 2 decides whether or not to route the call to the telephone network 30 depending on the predetermined criterion. If not, the session manager 74 initiates any one of a plurality of services available on the personal conferencing processor 40. Typically, the session manager initially prompts the user to select one of the available services. For example, the directory assistance manager 80 can be invoked in order to automatically retrieve a telephone number from directory 140. The retrieved number can be handed over to the session manager 74 which instructs the line manager 150 to switch the circuitry 130 and effect the call.

Personal conferencing processor 40 may, for example, comprise a suitably programmed personal computer.

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow.

What is claimed is:

1. A method for modifying a cordless handset base normally connected to a telephone network to allow the base to link the cordless handset to a computer, the method comprising:
   providing selective connection circuitry selectively linking the base to the computer or to the telephone network; and
   controlling the operation of the connection circuitry so as to connect the base either to the computer or to the telephone network in accordance with a predetermined criterion arriving from the cordless handset.

2. A method according to claim 1 wherein the predetermined criterion comprises whether the computer is on or off and wherein the controlling process includes sensing whether the computer is on or off.

3. Apparatus for selectively connecting a cordless handset base to a telephone network or to a computer, the apparatus comprising:
   selective connection circuitry selectively linking the base to the computer or to the telephone network; and
   a connection circuitry controlling device operative to control the operation of the connection circuitry so as to connect the base either to the computer or to the telephone network in accordance with a predetermined criterion arriving from the cordless handset.

* * * * *